V. CASSARD.
APPARATUS FOR KILLING POULTRY.
APPLICATION FILED AUG. 19, 1914.
1,118,635.
Patented Nov. 24, 1914.
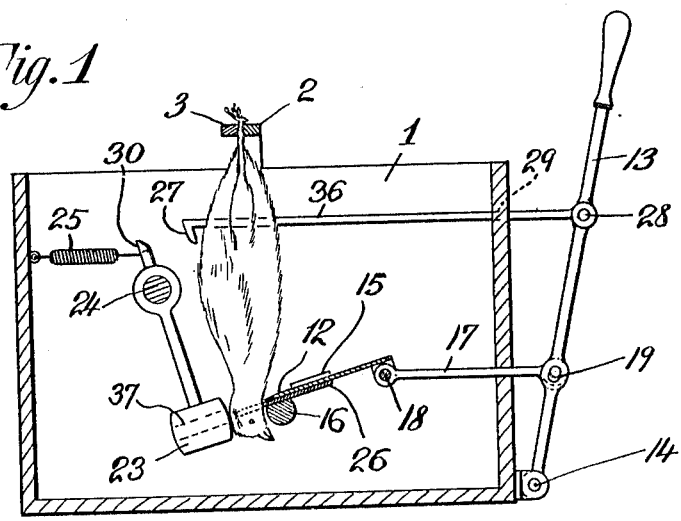
Fig. 1
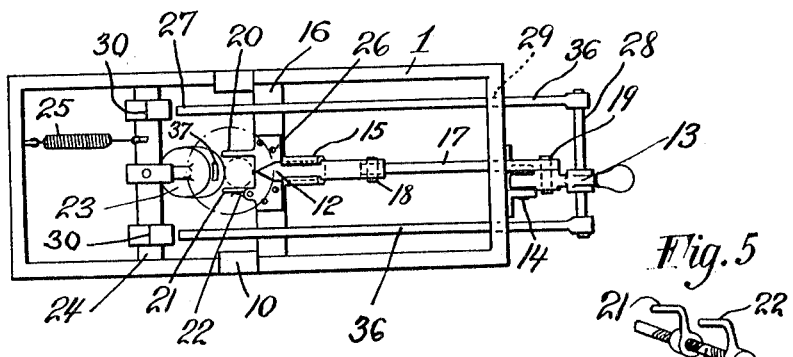
Fig. 2
Fig. 5
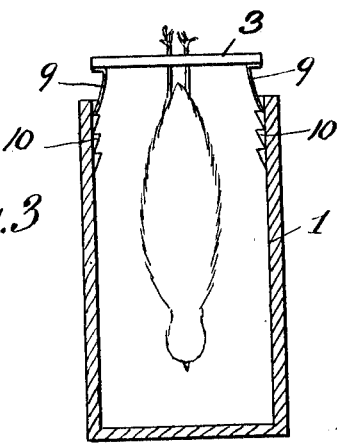
Fig. 3
Fig. 4
Witnesses:
Vernon Cassard Inventor
By his Attorneys

UNITED STATES PATENT OFFICE.

VERNON CASSARD, OF STAMFORD, CONNECTICUT.

APPARATUS FOR KILLING POULTRY.

1,118,635.  Specification of Letters Patent.  Patented Nov. 24, 1914.

Application filed August 19, 1914. Serial No. 857,437.

*To all whom it may concern:*

Be it known that I, VERNON CASSARD, a citizen of the United States of America, and a resident of Stamford, county of Fairfield, State of Connecticut, have invented certain new and useful Improvements in Apparatus for Killing Poultry, of which the following is a specification.

This invention relates to apparatus for killing poultry.

More specifically, this invention has for its object the provision of means for killing poultry in a manner whereby the operation will be of least objection to the operator, involve minimum pain to the fowl operated on and at the same time insure marketable condition of the killed fowl.

In accordance with my invention, the fowl is suspended from clamping means, and after adjustment of the head of the fowl, the operation of severing the arteries of the neck is performed mechanically, and, if desired, out of the sight of the operator.

Further features of my invention comprise the adjustable mounting means of the clamp for the feet of the fowl, and adjustable head clamps for properly positioning fowl of varying sizes.

In addition, my invention comprises the feature of a "hammer" for coöperating with the lance to render the fowl unconscious in minimum interval of time, such hammer being preferably operated automatically by the operating means of the lance.

Further features and objects of my invention will be more fully understood from the following description and accompanying drawings, in which—

Figure 1 is a diagrammatic side elevation showing an apparatus for killing poultry constructed in accordance with my invention; Fig. 2 is a plan view of Fig. 1, with the foot clamps removed; Fig. 3 is a detail diagrammatic elevation showing one form of mounting for the foot clamps; Fig. 4 is a detail perspective view of the foot clamps; and Fig. 5 is a detail showing the modified arrangement of adjusting the members of the head clamps.

Referring to the drawings, the frame 1 of the apparatus for killing poultry is indicated as a trough serving jointly as a base for the various parts of my apparatus and to collect blood and other matter incident to killing poultry, thereby rendering the operation sanitary. If desired, a hood or cover may be placed over the top of the trough 1 to conceal the operation of the apparatus after the fowl has been properly positioned therein.

The feet of the fowl are held in the foot clamp comprising the clamp members 2, 3, shown hinged together and provided with suitable openings 4, 5, for receiving the two feet of the fowl, and holding the same at spaced relation. The clamp members 2, 3, are locked by means of the registering openings 6, 7, constructed to receive the pin 8. The foot clamp 2, 3, is preferably mounted on adjustable supports, such as the oppositely resilient feet 9, 9, and the sets of vertically arranged steps 10, 10.

The lance 12 for severing the neck arteries of the fowl is operated by the lever 13 pivoted at 14 to the frame 1. The lance 12 is guided by the guide member 15 mounted on the bar 16 carried by the frame 1. The link 17 is pivoted to the lance 12 at 18 and pivoted to the lever 13 by means of the slotted pivotal connection 19. The head clamp is shown comprising the fixed clamp member 20 carried by bar 16 and the yieldingly mounted clamp member 21 shown spring pressed toward the fixed clamp member 20 by means of the spring 22. If desired, both clamp members 20, 21, may be mutually adjusted by adjusting means such as by mounting said clamp members 21, 22, on the right and left screw threaded shaft 35, as shown in Fig. 5, whereby upon properly turning the shaft 35, clamp members 21, 22, may be moved away or toward one other, as desired.

The "hammer" 23 is shown pivoted on the rod 24 normally tensioned by the spring 25 toward the bar 16 whereby the hammer 23 serves to complete the square inclosure for the head of the fowl bounded on the remaining sides by the head clamps 20, 21, and a portion of the bar 16. For simplicity of construction, guide 15, fixed head clamp 20 and adjusted head clamp 21 are mounted on the metal plate 26 secured by screws or the like to the bar 16.

After the feet of the fowl have been respectively positioned within the openings 4, 5, of the foot clamp 2, 3, and properly adjusted vertically by means of the clamp feet 9, 9, and steps 10, the hammer 23 is manually moved away from the bar 16 to permit the head of the fowl to be inserted between the head clamps 20, 21, whereupon the hammer 23 under restraint by the hand of the operator will be allowed to come in contact with the base of the head of the fowl, thereby holding the head of the fowl securely in position. The lever 13 is now pushed toward the fowl causing the lance 12 to pierce the arteries of the fowl without severing the head of the fowl from the body. The blood and such other matter which may be discharged incident to the killing of the fowl will be caught within the trough 1.

Suitable means is provided for operating the "hammer" 23 practically simultaneously with the operation of the lance 12. I have shown the hooks 27 having each arm 36 pivoted at 28 to the lever 13 and passing through a guide slot 29 through one side of the frame 1. The hooks 27 coöperate with trips 30 of the handle 31 of the "hammer" 23 whereby each hook 27 will pass from one side of its trip 30 to the other when the handle 13 is moved in the direction to operate the lance 12 but upon the return stroke of the handle 13, each hook 27 engages its trip 30 forcing the "hammer" 23 to be oscillated and tension the spring 25. After the "hammer 23" has been moved sufficiently outward away from the head of the fowl, each hook 27 will be cleared of its trip 30 of the handle 31, thereby releasing the "hammer" 23 to permit the same to strike the base of the head of the fowl.

It will be noted that the "hammer" serves to retain the head of the fowl in proper position, prior to and during the lancing operation, and that the "hammer" 23 also retains the head of the fowl in proper position after the "hammer" 23 has struck the head of the fowl, rendering it unconscious and at the same time preventing the fowl from flapping about and spreading the discharged blood. The arms 36 also serve to restrict the flapping of the fowl's wings. The clearance 37 in "hammer" 23 is provided for the point of the lance 12.

Whereas I have described my invention by reference to certain specific forms, it will be understood that many changes and modifications may be made without departing from my invention.

What I claim and desire to secure by Letters Patent is:—

1. In a poultry killing device, the combination of a trough, foot clamps, a lance positioned within the said trough, means for operating said lance and means for adjustably positioning said clamps on said trough relative to said lance.

2. In a poultry killing device, the combination of a trough, foot clamps, a lance positioned within said trough, means for operating said lance, said operating means comprising a lever positioned outside of said trough and means for adjustably positioning said foot clamps on said trough relative to said lance.

3. In a poultry killing device, the combination of a frame, foot clamps, means for adjustably mounting said foot clamps on said frame, a lance disposed within said frame, concussive means carried by said frame for striking the head of the fowl, and a lever for operating said lance and said concussive means.

4. In a poultry killing device, the combination of a lance, concussive means for striking the head of the fowl and means for mounting said concussive means to hold the head of the fowl in operative relation to said lance.

5. In a poultry killing device, the combination of a lance, of concussive means for striking the head of the fowl and common means for operating said lance and said concussive means.

6. In a poultry killing device, a frame, a lance positioned within said frame, concussive means disposed within said frame serving to strike the head of the fowl, and common means for operating said lance and said concussive means.

7. In a poultry killing device, a frame, a lance positioned within said frame, concussive means disposed within said frame serving to strike the head of the fowl, and common means for operating said lance and said concussive means, said common means comprising a handle positioned outside of said frame.

8. In a poultry killing device, a lance, a clamp for the head of the fowl positioned adjacent said lance, and concussive means disposed adjacent said clamp and adapted to strike the head of the fowl.

9. In a poultry killing device, the combination of a frame, a lance disposed within said frame, a lever for operating said lance, a clamp for the head of the fowl disposed adjacent said lance, concussive means disposed adjacent said clamp, and means controlled by said lever for operating said concussive means.

10. In a poultry killing device, a lance, a clamp for the head of the fowl positioned adjacent said lance comprising relatively adjustable clamp members adjacent said lance, concussive means disposed adjacent said clamp, and means controlled by said lever for operating said concussive means.

In testimony whereof I have signed this specification in the presence of two subscribing witnesses.

VERNON CASSARD.

Witnesses:
EDWARD N. BUCHANAN,
STANLEY T. JENNINGS.

Copies of this patent may be obtained for five cents each, by addressing the "Commissioner of Patents, Washington, D. C."